(12) United States Patent
McCauley et al.

(10) Patent No.: US 8,673,998 B2
(45) Date of Patent: Mar. 18, 2014

(54) POLYMER COMPOSITIONS WITH IMPROVED COLD FLOW

(75) Inventors: Kevin M McCauley, Akron, OH (US); Toshihiro Uchiyama, Copley, OH (US); Christine M. Rademacher, Akron, OH (US); Terrence E. Hogan, Cuyahoga Falls, OH (US)

(73) Assignee: Bridgestone Corporation, Tokyo (JP)

( * ) Notice: Subject to any disclaimer, the term of this patent is extended or adjusted under 35 U.S.C. 154(b) by 293 days.

(21) Appl. No.: 13/240,466

(22) Filed: Sep. 22, 2011

(65) Prior Publication Data

US 2012/0071583 A1 Mar. 22, 2012

Related U.S. Application Data

(60) Provisional application No. 61/385,209, filed on Sep. 22, 2010.

(51) Int. Cl.
*C08L 47/00* (2006.01)

(52) U.S. Cl.
USPC ............ 523/149; 523/156; 524/226; 524/212

(58) Field of Classification Search
USPC ....................................................... 523/149
See application file for complete search history.

(56) References Cited

U.S. PATENT DOCUMENTS

| | | | |
|---|---|---|---|
| 4,786,680 A | 11/1988 | Suzuki et al. | |
| 4,822,844 A | 4/1989 | Kawakami et al. | |
| 4,894,409 A | 1/1990 | Shimada et al. | |
| 4,929,679 A | 5/1990 | Akita et al. | |
| 4,950,719 A | 8/1990 | Oyama et al. | |
| 5,114,988 A | 5/1992 | Gagnon et al. | |
| 5,212,239 A | 5/1993 | Mallikarjun | |
| 5,292,790 A | 3/1994 | Shimizu et al. | |
| 5,576,376 A | 11/1996 | Shibata et al. | |
| 6,180,717 B1 | 1/2001 | Kawazura et al. | |
| 6,228,939 B1 | 5/2001 | Wang et al. | |
| 6,632,919 B1 | 10/2003 | Nielsen et al. | |
| 6,914,110 B2 | 7/2005 | Tsuji et al. | |
| 7,241,714 B2 | 7/2007 | Boussie et al. | |
| 7,271,288 B2 | 9/2007 | Takeuchi et al. | |
| 7,314,949 B2 | 1/2008 | Goredema et al. | |
| 7,410,636 B2 | 8/2008 | Collin | |
| 7,459,014 B2 | 12/2008 | Breton et al. | |
| 7,645,805 B2 | 1/2010 | van Bommel et al. | |
| 2003/0114577 A1 | 6/2003 | Yatsuyanagi et al. | |
| 2005/0245673 A1 | 11/2005 | Ferrari et al. | |
| 2006/0135352 A1 | 6/2006 | Schulte et al. | |
| 2007/0060658 A1 | 3/2007 | Diaz et al. | |
| 2008/0103287 A1 | 5/2008 | Chino et al. | |
| 2009/0105408 A1 | 4/2009 | Yan | |
| 2009/0292043 A1 | 11/2009 | Kurazumi et al. | |
| 2010/0004361 A1 | 1/2010 | McCauley et al. | |
| 2010/0036026 A1 | 2/2010 | Hogan et al. | |
| 2010/0125152 A1 | 5/2010 | Amey | |

FOREIGN PATENT DOCUMENTS

| | | | |
|---|---|---|---|
| EP | 0 290 962 A2 | | 11/1988 |
| EP | 2 075 282 | * | 7/2009 |
| WO | 2005088292 A1 | | 9/2005 |
| WO | 2008094963 A1 | | 8/2008 |

OTHER PUBLICATIONS

Org.Biomol.Chem., 2005, 3, 1631-1639.
J. Am. Chem. Soc. 1997, 119, 12675-12676.

* cited by examiner

*Primary Examiner* — Doris Lee
(74) *Attorney, Agent, or Firm* — Meredith E. Hooker; Arthur M. Reginelli

(57) ABSTRACT

A method for preparing a polymeric composition, the method comprising providing a polymer cement including a polymer and a solvent; introducing a cold-flow inhibitor with the polymer cement, where the cold-flow inhibitor is selected from the group consisting of vicinal diamides, vicinal diureas and vicinal amide-ureas; and isolating at least a portion of the polymer and the cold-flow inhibitor from the solvent to provide a polymeric composition including the polymer and the cold-flow inhibitor.

20 Claims, No Drawings

POLYMER COMPOSITIONS WITH IMPROVED COLD FLOW

This application claims the benefit of U.S. Provisional Application Ser. No. 61/385,209, filed on Sep. 22, 2010, which is incorporated herein by reference.

FIELD OF THE INVENTION

One or more embodiments of the present invention relate to polymer compositions having improved cold flow due to the presence of certain cold-flow inhibitors.

BACKGROUND OF THE INVENTION

Certain polymers, such as polydiene elastomers, exhibit cold flow at standard conditions. In other words, the polymers flow under their own weight, which causes problems when attempting to transport or store the polymers. Therefore, it is desirable to prevent cold flow from occurring by improving cold flow resistance of the polymer.

One solution employed in the art includes coupling the polymers. For example, linear polydienes, such as those polydienes produced by anionic polymerization or coordination catalysis, have been coupled with compounds. Although coupling agents may serve to improve cold flow resistance, they do not always serve to provide desired tire properties.

Therefore, in the art of making tires, particularly tire treads, functionalized polymers are advantageously employed to improve properties such as hysteresis loss. These functionalized polymers are often prepared by terminating growing polymer chains with functionalizing agents that impart a functional group on the end of the polymer chain.

Unfortunately, the functionalizing agents employed to terminate the polymer and provide advantageous properties to the tire do not always serve to provide cold flow resistance to the polymer. Furthermore, coupling agents, which improve cold flow resistance, are often incompatible with functionalizing agents while reacting with the polymer chain. Therefore, it is not always possible to combine functionalizing agents and coupling agents to achieve both good cold flow resistance and desired tire properties.

Because there remains a need for functionalized polymers, and in fact there is a desire for functionalized polymers with a high degree of functionality, the use of coupling agents that compete with the functionalizing agent can be detrimental to this goal. A need therefore exists to improve cold flow resistance by means other than coupling reactions.

SUMMARY OF THE INVENTION

One or more embodiments of the present invention provide a method for preparing a polymeric composition, the method comprising providing a polymer cement including a polymer and a solvent; introducing a cold-flow inhibitor with the polymer cement, where the cold-flow inhibitor is selected from the group consisting of vicinal diamides, vicinal diureas and vicinal amide-ureas; and isolating at least a portion of the polymer and the cold-flow inhibitor from the solvent to provide a polymeric composition including the polymer and the cold-flow inhibitor.

Other embodiments provide method for preparing a method for preparing a polymeric composition, the method comprising combining a polymer, solvent, and a cold-flow inhibitor defined by the formula

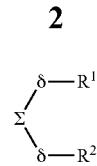

where $\Sigma$ is a conformationally-immobile hydrocarbyl group, each $\delta$ individually includes a ureido or amido group with each $\delta$ being vicinally spaced on said $\Sigma$, and $R^1$ and $R^2$ are each individually a monovalent organic group; and isolating at least a portion of the polymer and the cold-flow inhibitor from the solvent to provide a polymeric composition including the polymer and the cold-flow inhibitor.

Still other embodiments provide a polymeric composition comprising a polydiene or polydiene copolymer; and a cold-flow inhibitor selected from the group consisting of vicinal diamides, vicinal diureas and vicinal amide-ureas.

DETAILED DESCRIPTION OF ILLUSTRATIVE EMBODIMENTS

It has been observed that organic solvent gelators, which are compounds that are believed to self-assemble within organic solvents and thereby alter the viscosity of the solvent, do not, as a class, impact the cold flow properties of dienyl polymers (e.g., polybutadiene and poly(styrene-co-butadiene). As a result, the ability of a particular compound to act as a gelator for organic solvents offers little in the way of predicting whether the compound will impact the cold flow of dienyl polymers. Nonetheless, it has unexpectedly been discovered that certain gelators that include vicinal urea or amide groups reduce the cold flow of dienyl polymers.

In one or more embodiments, the gelators employed in the present invention, which may also be referred to as cold-flow inhibitors, include vincinal diamides, vicinal diureas, or vicinal amide-urea compounds. In one or more embodiments, these cold-flow inhibitors may be defined by the formula

where $\Sigma$ is a conformationally-immobile hydrocarbyl group, each $\delta$ individually is a ureido or amido group with each $\delta$ being vicinally spaced on said $\Sigma$, and $R^1$ and $R^2$ are each individually a monovalent organic group. In one or more embodiments, $R^1$ and $R^2$ are alkyl groups independently having at least 4, in other embodiments at least 5, in other embodiments at least 6, in other embodiments at least 7, in other embodiments at least 8, and in other embodiments at least 9 carbon atoms. In these or other embodiments, each $R^1$ and $R^2$ are an alkyl group independently having less than 20, in other embodiments less than 17, in other embodiments less than 16, and in other embodiments less than 15 carbon atoms.

As those skilled in the art appreciate, vicinal groups are positioned within three atoms of each other; i.e., there are two atoms between the groups. For example, the vicinal groups $\delta$ are attached to an alpha ($\alpha$) carbon and a beta ($\beta$) carbon, respectively, which are adjacent to one another as shown in the following formula:

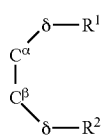

where $C^\alpha$ and $C^\beta$ are adjacent carbon atoms. In one or more embodiments, the vicinal groups are arranged in a trans configuration.

Those skilled in the art also appreciate that amido groups can be represented by the formula

and ureido groups can be represented by the formula

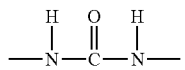

For purposes of this specification, δ may be an amido group or a ureido group, and δ may also include an amido or ureido group such as in the case of a polyamido or polyureido.

In one or more embodiments, conformationally-immobile hydrocarbyl groups include those groups that can fix or substantially hold the δ group (i.e., ureido or amido group) in a conformation that allows the compounds to stack or aggregate. These groups may be non-rotational or they may be rotational but have an equilibrium distribution shifted to the lowest energy conformation. Exemplary conformationally-immobile hydrocarbyl groups include phenyl groups, naphthenyl groups, anthracenyl groups, cyclopentyl groups, cyclohexyl groups, cycloheptyl groups, cyclopentadiene groups, and cyclohexadiene groups.

In one or more embodiments, monovalent organic groups may include hydrocarbyl groups or substituted hydrocarbyl groups such as, but not limited to, alkyl, cycloalkyl, substituted cycloalkyl, alkenyl, cycloalkenyl, substituted cycloalkenyl, aryl, allyl, substituted aryl, aralkyl, alkaryl, or alkynyl groups. Substituted hydrocarbyl groups include hydrocarbyl groups in which one or more hydrogen atoms have been replaced by a substituent such as an alkyl group. In one or more embodiments, these groups may include from one, or the appropriate minimum number of carbon atoms to form the group, to 20 carbon atoms. These hydrocarbyl groups may contain heteroatoms such as, but not limited to, nitrogen, boron, oxygen, silicon, sulfur, and phosphorus atoms.

Types of vicinal diamides include α,β-[bis(hydrocarbylamido)]hydrocarbylenes such as α,β-[bis(hydrocarbylamido)]benzenes, trans-α,β-[bis(hydrocarbylamido)]cyclohexanes, trans-α,β-[bis(hydrocarbylamido)]cyclopentanes, α,β-[bis(hydrocarbylamido)]cyclopentadienes, α,β-[bis(hydrocarbylamido)]cyclohexadienes, α,β-[bis(hydrocarbylamido)]anthracenes, and α,β-[bis(hydrocarbylamido)]naphthalenes.

Types of vicinal diureas include α,β-[(3,3'-bis(hydrocarbylureido)]hydrocarbylenes such as α,β-[3,3'-bis(hydrocarbylureido)]benzenes, trans-α,β[3,3'-bis(hydrocarbylureido)]cyclohexanes, trans-α,β-[3,3'-bis(hydrocarbylureido)]cyclopentanes, α,β-[3,3'-bis(hydrocarbylureido)]cyclopentadienes, α,β-[3,3'-bis(hydrocarbylureido)]cyclohexadienes, α,β-[3,3'-bis(hydrocarbylureido)]anthracenes, and α,β-[3,3'-bis(hydrocarbylureido)]naphthalenes.

Types of vicinal amide-ureas include α,β-[(3-hydrocarbylureido)(hydrocarbylamido)]hydrocarbylenes such as α,β-[(3-hydrocarbylureido)(hydrocarbylamido)]benzenes, trans-α,β-[(3-hydrocarbylureido)(hydrocarbylamido)]cyclohexanes, trans-α,β-[(3-hydrocarbylureido)(hydrocarbylamido)]cyclopentanes, α,β-[(3-hydrocarbylureido)(hydrocarbylamido)]cyclopentadienes, α,β-[(3-hydrocarbylureido)(hydrocarbylamido)]cyclohexadienes, α,β-[(3-hydrocarbylureido)(hydrocarbylamido)]anthracenes, and α,β-[(3-hydrocarbylureido)(hydrocarbylamido)]naphthalenes.

Specific examples of α,β-[bis(hydrocarbylamido)]benzenes include α,β-[bis(butylamido)]benzene, α,β-[bis(isopentylamido)]benzene, α,β-[bis(hexylamido)]benzene, α,β-[bis(octylamido)]benzene, α,β-[bis(dodecylamido)]benzene, α,β-[bis(cyclohexylamido)]benzene, α,β-[N-hexyl(amido)-N'-octyl(amido)]benzene, and α,β-[bis(phenylamido)]benzene.

Specific examples of trans-α,β-[bis(hydrocarbylamido)]cyclohexanes include trans-α,β-[bis(butylamido)]cyclohexane, trans-α,β-[bis(isopentylamido)]cyclohexane, trans-α,β-[bis(hexylamido)]cyclohexane, trans-α,β-[bis(octylamido)]cyclohexane, trans-α,β-[bis(dodecylamido)]cyclohexane, trans-α,β-[bis(cyclohexylamido)]cyclohexane, trans-α,β-[N-hexyl(amido)-N'-octyl(amido)]cyclohexane, and trans-α,β-[bis(phenylamido)]cyclohexane.

Specific examples of trans-α,β-[bis(hydrocarbylamido)]cyclopentanes include trans-α,β-[bis(butylamido)]cyclopentane, trans-α,β-[bis(isopentylamido)]cyclopentane, trans-α,β-[bis(hexylamido)]cyclopentane, trans-α,β-[bis(octylamido)]cyclopentane, trans-α,β-[bis(dodecylamido)]cyclopentane, trans-α,β-[bis(cyclohexylamido)]cyclopentane, trans-α,β-[N-hexyl(amido)-N'-octyl(amido)]cyclopentane, and trans-α,β-[bis(phenylamido)]cyclopentane.

Specific examples of α,β-[bis(hydrocarbylamido)]cyclopentadienes include α,β-[bis(butylamido)]cyclopentadiene, α,β-[bis(isopentylamido)]cyclopentadiene, α,β-[bis(hexylamido)]cyclopentadiene, α,β-[bis(octylamido)]cyclopentadiene, α,β-[bis(dodecylamido)]cyclopentadiene, α,β-[bis(cyclohexylamido)]cyclopentadiene, α,β-[N-hexyl(amido)-N'-octyl(amido)]cyclopentadiene, and α,β-[bis(phenylamido)]cyclopentadiene.

Specific examples of α,β-[bis(hydrocarbylamido)]cyclohexadienes include α,β-[bis(butylamido)]cyclohexadiene, α,β-[bis(isopentylamido)]cyclohexadiene, α,β-[bis(hexylamido)]cyclohexadiene, α,β-[bis(octylamido)]cyclohexadiene, α,β-[bis(dodecylamido)]cyclohexadiene, α,β-[bis(cyclohexylamido)]cyclohexadiene, α,β-[N-hexyl(amido)-N'-octyl(amido)]cyclohexadiene, and α,β-[bis(phenylamido)]cyclohexadiene.

Specific examples of α,β-[bis(hydrocarbylamido)]anthracenes include α,β-[bis(butylamido)]anthracene, α,β-[bis(isopentylamido)]anthracene, α,β-[bis(hexylamido)]anthracene, α,β-[bis(octylamido)]anthracene, α,β-[bis(dodecylamido)]anthracene, α,β-[bis(cyclohexylamido)]anthracene, α,β-[N-hexyl(amido)-N'-octyl(amido)]anthracene, and α,β-[bis(phenylamido)]anthracene.

Specific examples of α,β-[bis(hydrocarbylamido)]naphthalenes include α,β-[bis(butylamido)]naphthalene, α,β-[bis(isopentylamido)]naphthalene, α,β-[bis(hexylamido)]naphthalene, α,β-[bis(octylamido)]naphthalene, α,β-[bis(dodecylamido)]naphthalene, α,β-[bis(cyclohexylamido)]

naphthalene, α,β-[N-hexyl(amido)-N'-octyl(amido)]naphthalene, and α,β-[bis(phenylamido)]naphthalene.

Specific examples of α,β-[3,3'-bis(hydrocarbylureido)]benzenes include α,β-[3,3'-bis(butylureido)]benzene, α,β-[3,3'-bis(isopentylureido)]benzene, α,β-[3,3'-bis(hexylureido)]benzene, α,β-[3,3'-bis(octylureido)]benzene, α,β-[3,3'-bis(dodecylureido)]benzene, α,β-[3,3'-bis(cyclohexylureido)]benzene, α,β[3-hexyl(ureido)-3'-octyl(ureido)]benzene, and α,β-[3,3'-bis(phenylureido)]benzene.

Specific examples of trans-α,β-[3,3'-bis(hydrocarbylureido)]cyclohexanes include trans-α,β-[3,3'-bis(butylureido)]cyclohexane, trans-α,β-[3,3'-bis(isopentylureido)]cyclohexane, trans-α,β-[3,3'-bis(hexylureido)]cyclohexane, trans-α,β[3,3'-bis(octylureido)]cyclohexane, trans-α,β-[3,3'-bis(dodecylureido)]cyclohexane, trans-α,β-[3,3'-bis(cyclohexylureido)]cyclohexane, trans-α,β-[3-hexyl(ureido)-3'-octyl(ureido)]cyclohexane, and trans-α,β-[3,3'-bis(phenylureido)]cyclohexane.

Specific examples of trans-α,β-[3,3'-bis(hydrocarbylureido)]cyclopentanes include trans-α,β-[3,3'-bis(butylureido)]cyclopentane, trans-α,β-[3,3'-bis(isopentylureido)]cyclopentane, trans-α,β-[3,3'-bis(hexylureido)]cyclopentane, trans-α,β-[3,3'-bis(octylureido)]cyclopentane, trans-α,β-[3,3'-bis(dodecylureido)]cyclopentane, trans-α,β-[3,3'-bis(cyclohexylureido)]cyclopentane, trans-α,β-[3-hexyl(ureido)-3'-octyl(ureido)]cyclopentane, and trans-α,β-[3,3'-bis(phenylureido)]cyclopentane.

Specific examples of α,β-[3,3'-bis(hydrocarbylureido)]cyclopentadienes include α,β-[3,3'-bis(butylureido)]cyclopentadiene, α,β-[3,3'-(isopentylureido)]cyclopentadiene, α,β-[3,3'-bis(hexylureido)]cyclopentadiene, α,β-[3,3'-bis(octylureido)]cyclopentadiene, α,β-[3,3'-bis(dodecylureido)]cyclopentadiene, α,β-[3,3'-bis(cyclohexylureido)]cyclopentadiene, α,β-[3-hexyl(ureido)-3'-octyl(ureido)]cyclopentadiene, and α,β-[3,3'-bis(phenylureido)]cyclopentadiene.

Specific examples of α,β-[3,3'-bis(hydrocarbylureido)]cyclohexadienes include α,β-[3,3'-bis(butylureido)]cyclohexadiene, α,β[3,3'-bis(isopentylureido)]cyclohexadiene, α,β-[3,3'-bis(hexylureido)]cyclohexadiene, α,β-[3,3'-bis(octylureido)]cyclohexadiene, α,β-[3,3'-bis(dodecylureido)]cyclohexadiene, α,β-[3,3'-bis(cyclohexylureido)]cyclohexadiene, α,β-[3-hexyl(ureido)-3'-octyl(ureido)]cyclohexadiene, and α,β-[3,3'-bis(phenylureido)]cyclohexadiene.

Specific examples of α,β-[3,3'-bis(hydrocarbylureido)]anthracenes include α,β-[3,3'-bis(butylureido)]anthracene, α,β-[3,3'-bis(isopentylureido)]anthracene, α,β-[3,3'-bis(hexylureido)]anthracene, α,β-[3,3'-bis(octylureido)]anthracene, α,β-[3,3'-bis(dodecylureido)]anthracene, α,β-[3,3'-bis(cyclohexylureido)]anthracene, α,β-[3-hexyl(ureido)-3'-octyl(ureido)]anthracene, and α,β-[3,3'-bis(phenylureido)]anthracene.

Specific examples of α,β-[3,3'-bis(hydrocarbylureido)]naphthalenes include α,β-[3,3'-bis(butylureido)]naphthalene, α,β-[3,3'-bis(isopentylureido)]naphthalene, α,β-[3,3'-bis(hexylureido)]naphthalene, α,β-[3,3'-bis(octylureido)]naphthalene, α,β-[3,3'-bis(dodecylureido)]naphthalene, α,β-[3,3'-bis(cyclohexylureido)]naphthalene, α,β-[3-hexyl(ureido)-3'-octyl(ureido)]naphthalene, and α,β-[3,3'-bis(phenylureido)]naphthalene.

Specific examples of α,β-[(3-hydrocarbylureido)(hydrocarbylamido)benzenes include α,β-[(3-butylureido)(butylamido)]benzene, α,β-[(3-isopentylureido)(isopentylamido)]benzene, α,β-[(3-hexylureido)(hexylamido)]benzene, α,β-[(3-octylureido)(octylamido)]benzene, α,β-[(3-dodecylureido)(dodecylamido)]benzene, α,β-[(3-cyclohexylureido)(cyclohexylamido)]benzene, α,β-[(3-hexylureido)(octylamido)]benzene, and α,β-[(3-phenylureido)(phenylamido)]benzene.

Specific examples of trans-α,β-[(3-hydrocarbylureido)(hydrocarbylamido)]cyclohexanes include trans-α,β-[(3-butylureido)(butylamido)]cyclohexane, trans-α,β-[(3-isopentylureido)(isopentylamido)]cyclohexane, trans-α,β-[(3-hexylureido)(hexylamido)]cyclohexane, trans-α,β-[(3-octylureido)(octylamido)]cyclohexane, trans-α,β-[(3-dodecylureido)(dodecylamido)]cyclohexane, trans-α,β-[(3-cyclohexylureido)(cyclohexylamido)]cyclohexane, trans-α,β-[(3-hexylureido)(octylamido)]cyclohexane, and trans-α,β-[(3-phenylureido)(phenylamido)]cyclohexane.

Specific examples of trans-α,β-[(3-hydrocarbylureido)(hydrocarbylamido)]cyclopentanes include trans-α,β-[(3-butylureido)(butylamido)]cyclopentane, trans-α,β-[(3-isopentylureido)(isopentylamido)]cyclopentane, trans-α,β-[(3-hexylureido)(hexylamido)]cyclopentane, trans-α,β-[(3-octylureido)(octylamido)]cyclopentane, trans-α,β-[(3-dodecylureido)(dodecylamido)]cyclopentane, trans-α,β-[(3-cyclohexylureido)(cyclohexylamido)]cyclopentane, trans-α,β-[(3-hexylureido)(octylamido)]cyclopentane, and trans-α,β-[(3-phenylureido)(phenylamido)]cyclopentane.

Specific examples of α,β-[(3-hydrocarbylureido)(hydrocarbylamido)]cyclopentadienes include α,β-[(3-butylureido)(butylamido)]cyclopentadiene, α,β-[(3-isopentylureido)(isopentylamido)]cyclopentadiene, α,β-[(3-hexylureido)(hexylamido)]cyclopentadiene, α,β-[(3-octylureido)(octylamido)]cyclopentadiene, α,β-[(3-dodecylureido)(dodecylamido)]cyclopentadiene, α,β-[(3-cyclohexylureido)(cyclohexylamido)]cyclopentadiene, α,β-[(3-hexylureido)(octylamido)]cyclopentadiene, and α,β-[(3-phenylureido)(phenylamido)]cyclopentadiene.

Specific examples of α,β-[(3-hydrocarbylureido)(hydrocarbylamido)]cyclohexadienes include α,β-[(3-butylureido)(butylamido)]cyclohexadiene, α,β-[(3-isopentylureido)(isopentylamido)]cyclohexadiene, α,β-[(3-hexylureido)(hexylamido)]cyclohexadiene, α,β-[(3-octylureido)(octylamido)]cyclohexadiene, α,β-[(3-dodecylureido)(dodecylamido)]cyclohexadiene, α,β-[(3-cyclohexylureido)(cyclohexylamido)]cyclohexadiene, α,β-[(3-hexylureido)(octylamido)]cyclohexadiene, and α,β-[(3-phenylureido)(phenylamido)]cyclohexadiene.

Specific examples of α,β-[(3-hydrocarbylureido)(hydrocarbylamido)]anthracenes include α,β-[(3-butylureido)(butylamido)]anthracene, α,β-[(3-isopentylureido)(isopentylamido)]anthracene, α,β-[(3-hexylureido)(hexylamido)]anthracene, α,β-[(3-octylureido)(octylamido)]anthracene, α,β-[(3-dodecylureido)(dodecylamido)]anthracene, α,β-[(3-cyclohexylureido)(cyclohexylamido)]anthracene, α,β-[(3-hexylureido)(octylamido)]anthracene, and α,β-[(3-phenylureido)(phenylamido)]anthracene.

Specific examples of α,β-[(3-hydrocarbylureido)(hydrocarbylamido)]naphthalenes include α,β-[(3-butylureido)(butylamido)]naphthalene, α,β-[(3-isopentylureido)(isopentylamido)]naphthalene, α,β-[(3-hexylureido)(hexylamido)]naphthalene, α,β-[(3-octylureido)(octylamido)]naphthalene, α,β-[(3-dodecylureido)(dodecylamido)]naphthalene, α,β-[(3-cyclohexylureido)(cyclohexylamido)]naphthalene, α,β-[(3-hexylureido)(octylamido)]naphthalene, and α,β-[(3-phenylureido)(phenylamido)]naphthalene.

In particular embodiments, the cold-flow inhibitors are trans-α,β-bis(hydrocarbylureido)cyclohexanes or trans-α,β-bis(hydrocarbylamido)cyclohexanes, which may be defined by the formula

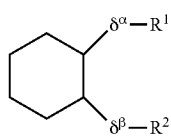

where each δ is a ureido or amido group, $R^1$ and $R^2$ are each individually a monovalent organic group having from 4 to 20 carbon atoms, and the $\delta^\alpha$ and the $\delta^\beta$ are in the trans configuration relative to one another. In one or more embodiments, $R^1$ and $R^2$ are each individually a monovalent organic group independently having from 5 to 16, or in other embodiments from 6 to 14, carbon atoms.

In one or more embodiments, the polymers that are introduced with the cold-flow inhibitor according to this invention include those polymers exhibiting low resistance to cold flow and therefore present technological difficulties during storage and transport.

In one or more embodiments, these polymers may be characterized by a disadvantageous cold flow as determined by employing standard cold flow measurements or derivatives thereof. These tests are well known to those skilled in the art. For example, gravitational cold flow may generally be determined according to the following method, which may be referred to as a standard test. A sample of the polymer to be tested is formed into a cylindrical shape having a diameter of about 10 mm and a height of about 13 mm. The cylinder is placed on one of its circular bases and left in place for 28 days; after which time the height of the cylinder is measured. Alternatively, these samples can be placed under a weight to simulate the force that would be excerpted on the polymer under the weight of additional bales of rubber that may be stacked on top of a bottom bale.

In other embodiments, similar tests can be performed in an accelerated manner using a Scott Tester. This may be determined by the following method, which may be referred to as an accelerated test. A 40 mm×13 mm cylinder can be placed on one of its cylindrical bases and a weight, such as a 5000 gram mass, can be placed on top of the cylinder for 30 minutes; after which time the height of the cylinder is measure.

In one or more embodiments, polymers that may be advantageously treated according to one or more embodiments of this invention include those polymers that are characterized by a cold flow, prior to treatment according to this invention, indicated by sample height of less than 7 mm, in other embodiments less than 6 mm, in other embodiments less than 5 mm, in other embodiments less than 4 mm, and in other embodiments less than 3 mm after a 13 mm cylindrical sample of the polymer is subjected to the standard cold test (i.e. gravitational cold flow analysis) for 28 days at room temperature.

In these or other embodiments, polymers that may be advantageously treated according to one or more embodiments of this invention include those polymers that are characterized by a cold flow, prior to treatment according to this invention, indicated by sample height of less than 7 mm, in other embodiments less than 6 mm, in other embodiments less than 5 mm, in other embodiments less than 4 mm, and in other embodiments less than 3 mm after a 13 mm cylindrical samples of the polymer is subjected to the accelerated cold flow test (i.e. accelerated gravitational cold flow analysis using a Scott Tester).

In one or more embodiments, the polymers that are introduced with the cold-flow inhibitor according to this invention include elastomers, which are polymers that are capable of being vulcanized to form vulcanizates exhibiting elastomeric properties. In one or more embodiments, the elastomers are unsaturated. In one or more embodiments, the elastomers have a glass transitions temperature (Tg) of less than 20° C., in other embodiments less than 10° C., in other embodiments less than 0° C., in other embodiments less than −10° C., in other embodiments less than −20° C., and in other embodiments less than −30° C.

In one or more embodiments, the polymers that are introduced with the cold-flow inhibitor according to this invention include linear molecules. In other embodiments, the polymers are substantially linear or only include limited branching.

In one or more embodiments, the polymers that are introduced with the cold-flow inhibitor according to this invention include natural and/or synthetic elastomers. In one or more embodiments, elastomers include polymers that are capable of being crosslinked or vulcanized to form cured compounds (also known as vulcanizates) that exhibit elastomeric properties. In one or more embodiments, the elastomers include dienyl polymers, which include synthetic elastomers that derive from the polymerization of conjugated diene monomers and optionally copolymerizable monomers. These conjugated diene monomers may be copolymerized with other monomers such as vinyl aromatic monomers. In one or more embodiments, conjugated diene monomers include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. In one or more embodiments, vinyl aromatic monomer includes styrene, α-methylstyrene, vinyl toluene, vinyl naphthalene, p-butyl styrene and t-butyl styrene. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star shaped.

In one or more embodiments, useful elastomers may have a number average molecular weight ($M_n$) of less than 500 kg/mol, in other embodiments less than 400 kg/mol, in other embodiments less than 300 kg/mol, in other embodiments less than 250 kg/mol, in other embodiments less than 200 kg/mol, in other embodiments less than 150 kg/mol, and in other embodiments less than 125 kg/mol. In these or other embodiments, the elastomers may have a number average molecular weight of at least 25 kg/mol, in other embodiments at least 50 kg/mol, in other embodiments at least 75 kg/mol, in other embodiments at least 100 kg/mol. In these or other embodiments, the molecular weight distribution of the elastomers ($M_n/M_w$) is less than 5.5, in other embodiments less than 4.5, in other embodiments less than 4.0, in other embodiments less than 3.5, in other embodiments less than 2.5, and in other embodiments less than 2.0. As is known in the art, $M_n$ (number average molecular weight) and $M_w$ (weight average molecular weight) may be determined by using gel permeation chromatography (GPC) calibrated with polystyrene standards and adjusted for the Mark-Houwink constants for the polymer in question.

In one or more embodiments, the elastomer is a homopolymer, and in other embodiments the elastomer is a copolymer, which refers to a polymer having two or more chemically distinct polymerization units, which may be referred to as mer units. In one or more embodiments, the mer units of the polymer may be cis, trans, or vinyl.

In particular embodiments, the elastomers are polydienes having a cis-1,4-linkage content that is greater than about 60%, in other embodiments greater than about 75%, in other embodiments greater than about 90%, and in other embodiments greater than about 95%. Also, these elastomers may have a 1,2-linkage content (i.e. vinyl content) that is less than about 7%, in other embodiments less than 5%, in other embodiments less than 2%, and in other embodiments less than 1%. The cis-1,4- and 1,2-linkage contents can be determined by infrared spectroscopy. The number average molecular weight ($M_n$) of these polydienes may be from about 25,000 to about 200,000, in other embodiments from about 30,000 to about 150,000, and in other embodiments from about 50,000 to about 120,000, as determined by using gel permeation chromatography (GPC) calibrated with polystyrene standards and Mark-Houwink constants for the polymer in question. The polydispersity of these polydienes may be from about 1.5 to about 5.0, and in other embodiments from about 2.0 to about 4.0. Exemplary high cis-polydienes include cis-1,4-polybutadiene, cis-1,4-polyisoprene, and cis-1,4-poly(butadiene-co-isoprene).

In one or more embodiments, the elastomers include a medium or low cis polydiene (or polydiene copolymer) including those prepared by anionic polymerization techniques. These elastomers can have a cis content of from about 10% to about 70%, in other embodiments from about 15% to about 60%, and in other embodiments from about 20% to about 50%, where the percentages are based upon the number of diene mer units in the cis configuration versus the total number of diene mer units. These elastomers may also have a 1,2-linkage content (i.e., vinyl content) from about 10% to about 60%, in other embodiments from about 15% to about 50%, and in other embodiments from about 20% to about 45%, where the percentages are based upon the number of diene mer units in the vinyl configuration versus the total number of diene mer units. The balance of the diene units may be in the trans-1,4-linkage configuration.

In particular embodiments, the elastomers include a random copolymer of butadiene, styrene, and optionally isoprene. In other embodiments, the elastomer is a block copolymer of polybutadiene, polystyrene, and optionally polyisoprene. In particular embodiments, the elastomer is hydrogenated or partially hydrogenated.

In one or more embodiments, the elastomers include anionically-polymerized polymer selected from the group consisting of polybutadiene, functionalized polyisoprene, functionalized poly(styrene-co-butadiene), functionalized poly(styrene-co-butadiene-co-isoprene), functionalized poly(isoprene-co-styrene), and functionalized poly(butadiene-co-isoprene). The number average molecular weight ($M_n$) of these polymers may be from about 25,000 to about 1,000,000, in other embodiments from about 50,000 to about 500,000, and in other embodiments from about 100,000 to about 300,000, as determined by using gel permeation chromatography (GPC) calibrated with polystyrene standards and Mark-Houwink constants for the polymer in question. The polydispersity of these polymers may be from about 1.0 to about 3.0, and in other embodiments from about 1.1 to about 2.0.

In one or more embodiments, the synthetic elastomers may include functionalized elastomers. In one or more embodiments, functionalized elastomers include at least one functional group. In one or more embodiments, a functional group is a group or substituent that is distinct from main portion of the polymer chain. In particular embodiments, the functional group includes a heteroatom. In certain embodiments, the functional group may be reactive or interactive with other polymer chains (propagating and/or non-propagating) or with other constituents that may be combined with the polymer such as reinforcing fillers (e.g., carbon black). In particular embodiments, functional groups include those groups attached to the polymer chain and reduce the 50° C. hysteresis loss of a carbon-black filled vulcanizate prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, the functionalized elastomers include a functional group located at the end of the polymer chain. In particular embodiments, the functional group may be located at the head of the polymer, which is the end of the polymer where initiation or polymerization of the polymer began. In other embodiments, the functional group may be located at the tail of the polymer, which is the end of the polymer where the polymerization thereof is terminated. In particular embodiments, the functionalized elastomer includes both head and tail functionalization; that is, the polymer includes at least one functional group located at the head of the polymer chain and at least one functional group located at the tail of the polymer chain.

Useful techniques for preparing functionalized elastomers are well known in the art. For example, these functional groups can be added to the polymer during synthesis of the elastomer or by grafting to the elastomer.

In one embodiment, the elastomers are synthesized by using anionic polymerization techniques. As is known in the art, an initiator including a functional group can be employed to produce polymers having a functional group located at the head of the polymer chain. For example, initiators that include cyclic amine groups, which impart a cyclic amine functionality to the resulting polymers. An example of these initiators includes lithio hexamethyleneimine, which is disclosed in U.S. Pat. Nos. 6,080,835; 5,786,441; 6,025,450; and 6,046,288, which are incorporated herein by reference. In another embodiment, the elastomers are synthesized by using anionic polymerization initiators that include at least one tin atom. These compounds, such as tin-lithium initiators, are believed to incorporate a tin atom at the head of the polymer chain. An example includes tributyltin lithium, which is disclosed in U.S. Pat. No. 5,268,439, which is incorporated herein by reference. In yet another embodiment, initiators that are dithioacetals can be employed to incorporate a heterocyclic group at the head of the polymer chain as disclosed in and U.S. Pat. No. 7,153,919 and U.S. Publication Nos. 2006/0264590, and 2006/0264589, which are incorporated herein by reference. Still others are disclosed in U.S. Pat. No. 7,335,712, which is incorporated herein by reference.

In yet another embodiment, anionically-polymerized elastomers, whether head-functionalized or not, are terminated with a coupling agent or a terminating agent that will impart an end functionality to the tail of the polymer. Useful compounds that may be used to couple or functionalize the tail end of the living polymers include, but are not limited to, those compounds that can be defined by the formula $R_nMX_{4-n}$, where R is an organic group, M is silicon or tin, X is a halogen atom, and n is a numeral from 0 to 3. Preferably, R is a simple alkyl group having from 1 to about 10 carbon atoms. Exemplary compounds include $SnCl_4$, $R_2SnCl_2$, and $RSnCl_3$, which are disclosed in U.S. Pat. No. 5,332,810, which is incorporated herein by reference. Other compounds that may be used alone or in conjunction with the foregoing tin or silicon compounds include metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates, imines, and epoxides.

In still another embodiment, elastomers synthesized with coordination catalyst systems, such as lanthanide-based catalyst systems, are terminated with a coupling agent or terminating agent that will impart an end functionality to the polymer. Useful coupling or functionalizing agents include those described above, which are described in International Application Nos. PCT/US00/30743 and PCT/US00/30875, which are incorporated herein by reference. In one or more embodiments, suitable functionalizing agents include those compounds that may contain groups such as ketone, aldehyde, amide, ester, imidazolidinone, isocyanate, and isothiocyanate groups. Examples of these compounds are disclosed in U.S. Publication Nos. 2006/0004131 A1, 2006/0025539 A1, 2006/0030677 A1, and 2004/0147694 A1, which are incorporated herein by reference. Other examples of functionalizing agents include azine compounds as described in U.S. Ser. No. 11/640,711, hydrobenzamide compounds as disclosed in U.S. Ser. No. 11/710,713, nitro compounds as disclosed in U.S. Ser. No. 11/710,845, and protected oxime compounds as disclosed in U.S. Ser. No. 60/875,484, all of which are incorporated herein by reference. Still others are disclosed in U.S. Pat. Nos. 4,906,706, 4,990,573, 5,064,910, 5,567,784, and 5,844,050, 6,992,147, 6977,281; U.S. Publication No. 2006/0004131A1; Japanese Patent Application Nos. 05-051406A, 05-059103A, 10-306113A, and 11-035633A, which are incorporated herein by reference. Useful functionalizing agents that can be used to couple reactive polymer chains, which compounds may also be referred to as coupling agents, include any of those known in the art including, but not limited to, metal halides such as tin tetrachloride, metalloid halides such as silicon tetrachloride, ester carboxylate metal complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

In one or more embodiments, the cold-flow inhibitor is introduced to the polymer to be treated within a polymeric cement. In one or more embodiments, the polymeric cement includes a solvent and the polymer. In preparing the polymer cements, the solvent may include a polar solvent, a nonpolar solvent, or mixture thereof. In one or more embodiments, the polar organic solvent is non-protic. An example of a useful non-protic, polar organic solvent is tetrahydrofuran (THF). Suitable types of nonpolar organic solvents include, but are not limited to, aliphatic, cycloaliphatic, and aromatic hydrocarbons. Some representative examples of these solvents include n-pentane, n-hexane, n-heptane, n-octane, n-nonane, n-decane, isopentane, isohexane, isoheptane, isooctane, 2,2-dimethyl butane, petroleum ether, kerosene, petroleum spirits, and isomers thereof. Some representative examples of suitable cycloaliphatic solvents include cyclopentane, cyclohexane, methylcyclopentane, methyl cyclohexane, and the like. Some representative examples of suitable aromatic solvents include benzene, pyridine, toluene, xylene, ethyl benzene, diethyl benzene, mesitylene, and mixtures of aliphatic, cycloaliphatic and aromatic compounds. Commercial mixtures of the above hydrocarbons, such as hexanes, may also be used.

The polymer cement may be prepared by using several techniques. In one embodiment, the cement is prepared by synthesizing elastomers within an organic solvent. In another embodiment, the cement is prepared by dissolving or suspending the elastomers within an organic solvent. In one or more embodiments, the elastomer is prepared in a non-polar solvent and the polar solvent is subsequently added to the solution of elastomer within the non-polar solvent.

In one or more embodiments, the rubbery elastomers can be synthesized by well-known techniques, and practice of this invention is not limited by the process used to prepare the polymer.

In any event, the polymer cement to which the cold-flow inhibitor is added may range in polymer concentration. In one or more embodiments, the polymer cement may include at least 10% by weight, in other embodiments at least 15% by weight, in other embodiments at least 20% by weight, and in other embodiments at least 25% by weight polymer based on the entire weight of the cement. In these or other embodiments, the polymer cement includes less than 60% by weight, in other embodiments less than 55% by weight, in other embodiments less than 50% by weight, in other embodiments less than 45% by weight, and in other embodiments less than 40% by weight polymer based on the entire weight of the cement.

In one or more embodiments, the cold-flow inhibitor is added directly to the polymer cement. In other embodiments, the cold-flow inhibitor is premixed with other compounds or solvents and added to the polymer cement as a premix, which may also be referred to as a masterbatch.

In one or more embodiments, the premix or masterbatch is formed by introducing the cold-flow inhibitor with a solvent in which the low molecular weight compound is soluble. For example, cold-flow inhibitors may be introduced with and dissolved within THF to form a premix, which may also be referred to as a masterbatch solution. To this premix may be added other constituents such as oils and/or compatibilizers.

In one or more embodiments, the cold-flow inhibitor may be added to the polymer cement while the polymer cement in undergoing mixing or agitation, and this mixing or agitation may continue after introduction of the cold-flow inhibitor.

In one or more embodiments, the introduction of the cold-flow inhibitor may take place under atmospheric pressure. In other embodiments, the introduction of the cold-flow inhibitor may take place under pressure in excess of 1.5 atm, in other embodiments in excess of 2.0 atm, and in other embodiments in excess of 3.0 atm, and in other embodiments between 1 and 4 atm. In these or other embodiments, the introduction may take place while the cement is at a temperature of from about 30 to about 130° C., in other embodiments from about 40 to about 120° C., and in other embodiments from about 50 to about 100° C. In one or more embodiments, the cement is maintained within these temperature ranges during the addition process, and optionally during mixing or agitation.

In one or more embodiments, the amount of cold-flow inhibitor added to the polymer cement may be at least 0.5 parts by weight (pbw), in other embodiments at least 1.0 pbw, in other embodiments at least 1.5 pbw, and in other embodiments at least 2.0 pbw per 100 parts by weight of the polymer (phr). In these or other embodiments, the amount of cold-flow inhibitor added to the polymer cement may be less than 5.0 pbw phr, in other embodiments less than 4.5 pbw phr, in other embodiments less than 4.0 pbw phr, in other embodiments less than 3.0 pbw phr, and in other embodiments less than 2.0 pbw phr.

In one or more embodiments, after introduction of the cold-flow inhibitor to the cement, the polymer and at least a portion of the cold-flow inhibitor are isolated, or substantially isolated, from the solvent. In particular embodiments, the isolated product is further dried. Conventional procedures for desolventization and drying may be employed. In one embodiment, the polymer and cold-flow inhibitor may be isolated from the solvent by steam desolventization. Residual water may be removed by oven drying. Alternatively, solvent may be removed by using conventional drying techniques such as a drum dryer. Alternatively, the solvent can be removed by evaporation. In one or more embodiments, removal of the solvent results in a solid-state polymer mass (e.g., a bail) wherein the cold-flow inhibitor dispersed throughout the polymer.

It is believed that the cold-flow inhibitors self assemble within the polymer solution or within the polymer composition. It is believed that the assemblies of the cold-flow inhibitors can be disrupted by applying heat or mechanical energy to the polymer composition or solution. Accordingly, in one or more embodiments, desolventization of the polymer solution takes place at a rate that is slower than conventional desolventization processes. Also, in one or more embodiments, the rate at which the desolventized polymer is cooled after heating of the polymer (which technique is often used to drive off residual water from the polymer) is slower than conventional cooling rates so as to allow for self assembly of the cold-flow inhibitors.

The polymer product produced by one or more embodiments of the present invention may be characterized by an advantageous cold flow resistance. This advantageous cold flow resistance may be represented at least a 10% increase, in other embodiments at least a 20% increase, in other embodiments at least a 30% increase, in other embodiments at least a 40% increase, in other embodiments at least a 80% increase, and in other embodiments at least a 100% increase, and in other embodiments at least a 500% increase, and in other embodiments at least a 1000% increase in gravitational cold flow as compared to similar polymeric compositions that do not include the cold-flow inhibitor, where the cold flow resistance is determined using the gravitational analysis described above The polymer product produced by one or more embodiments of the present invention may be characterized by an advantageous cold flow resistance. This advantageous cold flow resistance may be represented at least a 10% increase, in other embodiments at least a 20% increase, in other embodiments at least a 30% increase, in other embodiments at least a 40% increase, in other embodiments at least a 80% increase, and in other embodiments at least a 100% increase, and in other embodiments at least a 200% increase, and in other embodiments at least a 300% increase in gravitational cold flow as compared to similar polymeric compositions that do not include the cold-flow inhibitor, where the accelerated cold flow resistance is determined using the Scott tester and analysis described above.

In one or more embodiments, the polymeric compositions produced according to the present invention may be employed to prepare vulcanizable compositions. In preparing the vulcanizable compositions of matter, the polymer may be combined with other ingredients such as fillers and like, which are well known in the art of rubber compounding.

The rubber compositions may include fillers such as inorganic and organic fillers. The organic fillers include carbon black. The inorganic fillers may include silica, aluminum hydroxide, magnesium hydroxide, clays (hydrated aluminum silicates), and mixtures thereof.

A multitude of rubber curing agents may be employed. For example, sulfur or peroxide-based curing systems may be employed. Also, see Kirk-Othmer, ENCYCLOPEDIA OF CHEMICAL TECHNOLOGY, $3^{rd}$ Edition, Wiley Interscience, N.Y. 1982, Vol. 20, pp. 365-468, particularly VULCANIZATION AGENTS AND AUXILIARY MATERIALS pp. 390-402, or Vulcanization by A. Y. Coran, ENCYCLOPEDIA OF POLYMER SCIENCE AND ENGINEERING, $2^{nd}$ Edition, John Wiley & Sons, Inc., 1989, which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

Fillers are typically employed in an amount from about 1 to about 100 phr, and preferably from about 20 to about 90 phr, and more preferably from about 35 to about 80 phr, where phr refers to parts by weight ingredient per 100 parts by weight rubber within the compound, which may include the rubber within the premix as well as any additional rubber that may be added during compounding.

The vulcanizable rubber composition may be prepared by forming an initial masterbatch that includes the premix and filler. This initial masterbatch may be mixed at a starting temperature of from about 25° C. to about 100° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which does not initiate the vulcanization process. Optionally, additional mixing stages, sometimes called remills, can be employed between the masterbatch mix stage and the final mix stage. Rubber compounding techniques and the additives employed therein are generally known as disclosed in the in *The Compounding and Vulcanization of Rubber*, by Stevens in RUBBER TECHNOLOGY SECOND EDITION (1973 Van Nostrand Reinhold Company). The mixing conditions and procedures applicable to silica-filled tire formulations are also well known as described in U.S. Pat. Nos. 5,227,425; 5,719,207; 5,717,022, as well as EP 0890606, all of which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it is heated to about 170° C. Cured or crosslinked rubber compositions may be referred to as vulcanizates, which generally contain three-dimensional polymeric networks that are thermoset. The other ingredients, such as processing aides and fillers, are generally evenly dispersed throughout the vulcanized network. Tire components of this invention preferably include tire treads. The rubber compositions, however, can also be used to form other elastomeric tire components such as subtreads, sidewalls, body ply skims, bead fillers and the like. Pneumatic tires can be made as discussed in U.S. Pat. Nos. 5,866,171; 5,876,527; 5,931,211; and 5,971,046, which are incorporated herein by reference.

The vulcanizable rubber compositions prepared according to this invention may also be employed in the manufacture of other rubber articles. For example, they may be employed in the manufacture of rubber air springs, which are vibration damping devices that are typically employed in trucks. They may also be employed in manufacture of rubber sheeting and other articles that are employed in preparing roofing materials. They may also be used in the manufacture of hoses.

In order to demonstrate the practice of the present invention, the following examples have been prepared and tested. The examples should not, however, be viewed as limiting the scope of the invention. The claims will serve to define the invention.

EXAMPLES

Example 1

Preparation of C8 vicinal diamide

To a capped, nitrogen-purged 0.8 L bottle was added toluene (300 mL), trans-1,2-diaminocyclohexane (17.5 mmol, 2.1 mL), and triethylamine (36.8 mmol, 5.1 mL). After agitating the solution for 1 minute, octanoyl chloride (35 mmol, 6 mL) was added to the bottle with agitation. The bottle was transferred to a 65° C. water bath and agitated for 2.5 hours. The resulting solution contained precipitated triethylamine-HCl and was filtered hot in order to avoid gel formation upon cooling. The clear solution was concentrated to a cream colored powder, to yield 7.2 grams (74%) of trans-1,2-bisoctylamido cylcohexane (C8 diamide), which was pure by $^1$H NMR (CDCl$_3$): δ6.1 (s, 2H), 3.6 (m, 2H), 2.1 (t, 4H), 2.0 (d, 2H), 1.7 (m, 2H), 1.6 (t, 4H) 1.3 (s, 20H), 0.9 (t, 6H); mp 83° C., 173° C.

Preparation of C10 vicinal diamide

To a capped, nitrogen-purged 0.8 L bottle was added toluene (300 mL), trans-1,2-diaminocyclohexane (17.5 mmol, 2.1 mL), and triethylamine (36.8 mmol, 5.1 mL). After agitating the solution for 1 minute, decanoyl chloride (35 mmol, 7.2 mL) was added to the bottle with agitation. The bottle was transferred to a 65° C. water bath and agitated for 2.5 hours. The resulting solution contained precipitated triethylamine-HCl and was filtered hot in order to avoid gel formation upon cooling. The clear solution was concentrated to a cream colored powder to yield 4.8 grams (65%) of trans-1,2-bisdecanylamido cylcohexane (C10 diamide), which was pure by 1H NMR (CDCl$_3$): δ6.1 (s, 2H), 3.6 (m, 2H), 2.1 (t, 4H), 2.0 (d, 2H), 1.7 (m, 2H), 1.6 (t, 4H), 1.3 (s, 28H), 0.9 (t, 6H); mp 117° C., 159° C.

Preparation of C12 vicinal diamide

To a capped, nitrogen-purged 0.8 L bottle was added toluene (300 mL), trans-1,2-diaminocyclohexane (15.8 mmol, 1.9 mL), and triethylamine (33.6 mmol, 4.7 mL). After agitating the solution for 1 minute, lauroyl chloride (i.e., C12 chloride) (31.5 mmol, 7.3 mL) was added to the bottle with agitation. The bottle was transferred to a 65° C. water bath and agitated for 2.5 hours. The resulting solution contained precipitated triethylamine-HCl and was filtered hot in order to avoid gel formation upon cooling. The clear solution was concentrated to a white powder and then re-crystallized from dichloromethane to a white, needle-like powder to yield 6.6 grams (88%) of trans-1,2-bislaurylamido cyclohexane (C12 diamide): $^1$H NMR (CDCl$_3$) δ5.9 (s, 2H), 3.7 (m, 2H), 2.1 (m, 8H), 1.7 (m, 18H), 1.4 (s, 22H), 0.9 (t, 6H); mp 59° C., 66° C.

Preparation of C16 vicinal diamide

To a capped, nitrogen-purged 0.8 L bottle was added toluene (300 mL), trans-1,2-diaminocyclohexane (17.5 mmol, 2.1 mL), and triethylamine (36.8 mmol, 5.1 mL). After agitating the solution for 1 minute, palmitoyl chloride (C16 chloride) (35 mmol, 10.6 mL) was added to the bottle with agitation. The bottle was transferred to a 65° C. water bath and agitated for 2.5 hours. The resulting solution contained precipitated triethylamine-HCl and was filtered hot in order to avoid gel formation upon cooling. The clear solution was concentrated to a white, needle-like powder, which was determined to be trans-1,2-bispalmitalcyclohexane (C16 diamide) (approx. yield=9.5 grams, 92%): $^1$H NMR (CDCl$_3$) δ5.8 (s, 2H), 3.6 (m, 2H), 2.1 (t, 4H), 2.0 (d, 2H), 1.7 (m, 2H), 1.6 (t, 22H), 1.3 (overlapping s, 34H), 0.9 (t, 6H); mp 85° C., 130° C., 145° C.

Example 2

SBR Treated with vicinal diamides

The diamides prepared above were combined with styrene-butadiene rubber (SBR) (55% vinyl, 20% styrene, $M_n$=110k). Specifically, solid polymer and solid diamide were combined into respective samples at 0.5, 1, 2, 3, 4 and 6% of diamide based on the weight of the polymer. The solids mixture was then dissolved in THF to a concentration of about 10% solids. The polymer solution was desolventized by evaporation and was dried at 60° C. under vacuum to provide SBR having the diamide dispersed therein.

The various samples were subjected to gravitational cold flow measurements under both "load" and "no-load" conditions. Each polymer sample (2.5 grams) was melt pressed in an Instron compression mold using a Carver Press at 100° C. for 20 minutes. After cooling, the samples were removed from the press as cylinder shapes with a diameter and height of uniform thickness of 13.0 mm. Where a "load" was applied, the gravitational cold flow test used an 11.4 g weight, which was used to simulate the weight of a stack of six bales of polymer to compress each sample.

Under "no load" conditions, the SBR samples treated with the vicinal diamides resisted cold flow for extended periods of time. For example, those treated with the C8 vicinal diamide resisted cold flow for at least 30 days, while those treated with C12 vicinal diamides resisted cold flow for at least 60 days. It was observed that the C16 diamides did not perform as well as the diamides with shorter alkyl chains (e.g. C8 and C12 diamides). A second set of C16 buttons was also prepared in the same manner as the above, but the polymer/gelator mixture was milled just prior to melt pressing. These buttons flowed readily within the first day under no-load conditions, which result implies that some aggregation of the gelator is beneficial in order to form a stabilizing network.

Under "load" conditions, the SBR samples treated with vicinal diamides offered less resistance to cold flow, although compared to samples without the vicinal diamides, some resistance was observed.

Example 3

Rubber Compounds with Treated SBR

SBR treated with the C12 diamide above (using similar methods where the diamide was added to polymer cement and then desolventized) were prepared and the polymer having the diamide dispersed therein was employed to prepare rubber compositions of the type that are useful in the manufacture of tire treads. The ingredients used in the preparation of the rubber compositions are set forth in Table I. As can be gleaned from Table I, the rubber compositions were prepared by using a two-stage mixing procedure wherein higher mix temperatures and energies were employed in the first mix stage, and lower temperatures and less mix energies were employed in the second mix stage.

TABLE I

|  | Parts by Weight |
|---|---|
| Master Batch | |
| Polymer | 100 |
| Gelator | 0, 1, 2, 3 |
| Carbon Black (N343) | 50 |
| Black Oil | 10 |
| Stearic Acid | 2 |
| Wax Blend | 2 |
| santoflex | 0.95 |
| Total | 164.95 |
| Final Batch | |
| master batch | 164.95 |
| Sulfur | 1.5 |
| DPG accelerator | 0.3 |
| MBTS accelerator | 0.5 |
| TBBS accelerator | 0.5 |

The various rubber compositions were prepared into uncured test samples and cured at 171° C. for 15 minutes within a Carver press. The specimens were then subjected to various mechanical and dynamic tests as shown in Table II, where the results of the various analyses are reported.

TABLE II

|  | Samples | | | |
|---|---|---|---|---|
|  | 1 | 2 | 3 | 4 |
| C12 diamide | — | 1% | 2% | 3% |
| 171° C. Cure Rheometer t50% (min) | 2.48 | 2.54 | 2.55 | 2.48 |
| 171° C. Cure Rheometer t90% (min) | 7.28 | 7.79 | 8.16 | 8.05 |
| 171° C. Cure Rheometer MH-ML (kg-cm) | 17.3 | 16.7 | 15.9 | 16.1 |
| ML1 + 4 @ 130° C. | 18.3 | 18.3 | 17.2 | 16.8 |
| G'(MPa) [SS; 60° C.; 10 Hz, 5%] | 2.62 | 2.93 | 2.89 | 3.02 |
| tan δ [SS; 60° C.; 10 Hz, 5%] | 0.2464 | 0.2511 | 0.261 | 0.2636 |
| ΔG'(MPa) [SS; 60° C.; 10 Hz, 0.25%-14.25%] | 3.52 | 4.44 | 4.48 | 4.78 |

The cure characteristics (t50, t90, and MH-ML) were measured by using a cure Rheometer at 171° C. The Mooney viscosity ($ML_{1+4}$) of the uncured compound was determined at 130° C. by using a Alpha Technologies Mooney viscometer with a large rotor, a one-minute warm-up time, and a four-minute running time. The Payne effect data (ΔG') and hysteresis data (tan δ) of the vulcanizates were obtained from a dynamic strain sweep experiment, which was conducted at 50° C. and 15 Hz with strain sweeping from 0.1% to 20%. ΔG' is the difference between G' at 0.25% strain and G' at 14.25% strain. Tensile properties were determined using procedures set forth in ASTM D 412.

The data in Table II suggests that the cold-flow inhibitors behave like oils or waxes at elevated temperatures as demonstrated by the tan delta and modulus measurements. The data of Table II otherwise suggests that the vicinal diamides do not have a deleterious impact on the polymer vulcanizate properties.

Example 4

Preparation of C7 vicinal diurea

To a capped, nitrogen-purged 0.8 L bottle was added toluene (300 mL) and trans-1,2-diaminocyclohexane (17.7 mmol, 2.1 mL). After agitating the solution for 1 minute, heptyl isocyanate (35.4 mmol, 5.7 mL) was added to the bottle with agitation. The bottle was transferred to a 65° C. water bath and agitated for 2 hours. The resulting solution contained a white precipitate and was filtered from solution. After washing with hexane (100 mL), the white solid was dried at 60° C. under vacuum to yield 5.4 gram (77%) of trans-1,2-bisheptyluriedocyclohexane. (C7 diurea) $^1$H NMR (DMSO-d6): δ5.8 (t, 2H), 5.6 (d, 2H), 3.2 (m, 2H), 2.9 (m, 4H), 1.8 (d, 2H), 1.6 (m, 2H), 1.3 (m, 24H), 0.8 (t, 6H); mp 224° C.

Preparation of C12 vicinal diurea

To a capped, nitrogen-purged 0.8 L bottle was added toluene (200 mL) and trans-1,2-diaminocyclohexane (7.9 mmol, 0.9 mL). After agitating the solution for 1 minute, undecyl isocyanate (15.8 mmol, 3.6 mL) was added to the bottle with agitation. The bottle was transferred to a 65° C. water bath and agitated for 2 hours. The resulting solution contained a white precipitate and was filtered from solution. After washing with hexane (100 mL), the white solid was dried at 60° C. under vacuum to yield 3.0 gram (75%) of trans-1,2-bisundecylureidocyclohexane (C12 diurea) $^1$H NMR (DMSO-d6): δ5.8 (t, 2H), 5.6 (d, 2H), 2.9 (m, 4H), 2.7 (m, 1H), 2.3 (m, 1H), 1.8 (d, 2H), 1.6 (m, 2H), 1.3 (m, 40H), 0.8 (t, 6H); mp 208° C.

Example 5

SBR Treated with vicinal diureas

SBR (60.9% 1, 2, 20.9% styrene, and 10.0% block styrene), which was similar to that employed above, was treated with the vicinal diureas of Example 4 by dissolving the diureas in a polymer cement containing the SBR dissolved in THF. Once the diurea was fully dissolved, the solvent was allowed to evaporate from the polymer solution which eventually forms a homogenous solid. No aggregated particles of diurea were visually observed in the polymer samples. The polymer containing diurea was dried in a vacuum oven at 60° C. for 5 hours.

Various amounts of the diurea were dissolved into various polymer cements as set forth in Table III below. The samples were observed for resistance to cold flow in a manner similar to that set forth above; i.e. they were tested for both "load" and "no load" resistance to cold flow, as well as tested using a Scott tester.

TABLE III

|  | Samples | | | | | | |
|---|---|---|---|---|---|---|---|
|  | 4A | 4B | 4C | 4D | 4E | 4F | 4G |
| C7 Diurea | 0 | 1.0 | 2.0 | 3.0 | 0 | 0 | 0 |
| C12 Diurea | 0 | 0 | 0 | 0 | 1.0 | 2.0 | 3.0 |
| Gravitational Cold Flow (30 days; mm) | 6 | 9.3 | 11.3 | 9.6 | 11.1 | 12.5 | 12.5 |
| Scott Tester (30 min; mm) | 8.9 | 9.1 | 9.7 | 10.2 | 9.5 | 9.9 | 10.6 |

As seen from the data in Table III, the addition of bis (ureido)cyclohexane to unfunctionalized SBR resulted in improvement of cold flow resistance when compared to SBR that did not contain bis(ureido)cyclohexane.

Rubber Compounds with Treated SBR

The SBR treated with the diureas (using similar methods where the diurea was added to polymer cement and then desolventized) were prepared and the polymer having the diurea dispersed therein was employed to prepare rubber compositions of the type that are useful in the manufacture of tire treads. The ingredients used in the preparation of the rubber compositions are set forth in Table IV. As can be gleaned from Table IV, the rubber compositions were prepared by using a three-stage mixing procedure wherein higher mix temperatures and energies were employed in the first mix stage, and lower temperatures and less mix energies were employed in the second and third mix stages. This three-stage is conventional for rubber compositions including silica.

TABLE IV

|  | Parts by weight |
| --- | --- |
| Master Batch |  |
| SBR | 80 |
| Gelator | 0.8, 1.6, 2.4 |
| NR | 20 |
| Silica | 52.5 |
| Black Oil | 10 |
| Stearic Acid | 2 |
| Wax Blend | 2 |
| Antioxidant | 0.95 |
| Remill |  |
| Master Batch | 167.45 |
| Silica | 2.5 |
| Silane coupling agent | 5 |
| Final Batch |  |
| Remill | 174.95 |
| sulfur | 1.5 |
| DPG | 1.4 |
| TBBS | 0.7 |
| MBTS | 2 |
| ZnO | 2.5 |

The various rubber compositions were prepared into test samples and cured at 171° C. for 15 minutes within a Carver press. The specimens were then subjected to various mechanical and dynamic tests as shown in Table V, where the results of the various analyses are reported.

TABLE V

|  | Samples | | | | | | |
| --- | --- | --- | --- | --- | --- | --- | --- |
|  | 1 | 2 | 3 | 4 | 5 | 6 | 7 |
| C7 Diurea | 0 | 1.0 | 2.0 | 3.0 | 0 | 0 | 0 |
| C12 Diurea | 0 | 0 | 0 | 0 | 1.0 | 2.0 | 3.0 |
| ML1 + 4 @ 130° C. | 22.1 | 20.3 | 19.9 | 19.2 | 21.2 | 19.8 | 18.4 |
| 171° C. Cure Rheometer t90 (min) | 8.93 | 8.05 | 7.73 | 6.88 | 7.51 | 7.97 | 7.74 |
| G' (MPa) [SS; 60° C.; 10 Hz, 5%] | 4.14 | 4.21 | 4.14 | 4.11 | 4.45 | 4.29 | 3.99 |
| tan δ [SS; 60° C.; 10 Hz, 5%] | 0.142 | 0.146 | 0.142 | 0.141 | 0.143 | 0.139 | 0.142 |
| ΔG' (MPa) [SS; 60° C.; 10 Hz, 0.25%-14.25%] | 4.52 | 4.79 | 4.59 | 4.62 | 5.08 | 4.80 | 4.35 |

It is initially noted that the rubber compositions employed an all silica formulation (Table IV). The results were compared against unfunctionalized SBR that did not contain bis(ureido)cyclohexanes and shown in Table V. It can be seen that the addition of bis(ureido)cyclohexanes to unfunctionalized SBR shows similar physical properties. The compound Mooney viscosities suggest similar processing abilities between SBR with bis(ureido)cyclohexanes and unmodified SBR. Likewise, elongation at break and tensile break stress are also similar. With respect to tan δ values, SBRs containing bis(ureido)cyclohexanes show similar hysteresis loss to unmodified SBR.

Various modifications and alterations that do not depart from the scope and spirit of this invention will become apparent to those skilled in the art. This invention is not to be duly limited to the illustrative embodiments set forth herein.

What is claimed is:

1. A method for preparing a polymeric composition, the method comprising:
   i) providing a polymer cement including a polymer and a solvent;
   ii) introducing a cold-flow inhibitor with the polymer cement, where the cold-flow inhibitor is selected from the group consisting of vicinal diamides, vicinal diureas, and vicinal amide-ureas; and
   iii) isolating at least a portion of the polymer and the cold-flow inhibitor from the solvent to provide a polymeric composition including the polymer and the cold-flow inhibitor.

2. The method of claim 1, where the polymer includes a polydiene or a polydiene copolymer.

3. The method of claim 2, where the polydiene is polybutadiene having a cis-1,4 content of at least 90%.

4. The method of claim 2, where the polydiene copolymer includes polymerization units deriving from a diene and a vinyl aromatic.

5. The method of claim 4, where the diene is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene, and where the vinyl aromatic is selected from the group consisting of styrene, α-methylstyrene, vinyl toluene, vinyl naphthalene, p-butyl styrene and t-butyl styrene.

6. The method of claim 2, where the polymer cement includes from about 10 to about 40% by weight of the polymer.

7. The method of claim 1, where said step of introducing includes introducing at least 0.5 parts by weight and less than 5.0 parts by weight of the cold-flow inhibitor per 100 parts by weight polymer.

8. The method of claim 1, where the cold-flow inhibitor is a vicinal diamide selected from the group consisting of α,β-[bis(hydrocarbylamido)]benzenes, trans-α,β-[bis(hydrocarbylamido)]cyclohexanes, trans-α,β-[bis(hydrocarbylamido)]cyclopentanes, α,β-[bis(hydrocarbylamido)]cyclopentadienes, α,β-[bis(hydrocarbylamido)]cyclohexadienes, α,β-[bis(hydrocarbylamido)]anthracenes, or α,β-[bis(hydrocarbylamido)]naphthalenes.

9. The method of claim 1, where the cold-flow inhibitor is a vicinal diurea selected from the group consisting of α,β-[3,3'-bis(hydrocarbylureido)]benzenes, trans-α,β-[3,3'-bis(hydrocarbylureido)]cyclohexanes, trans-α,β-[3,3'-bis(hydrocarbylureido)]cyclopentanes, α,β-[3,3'-bis(hydrocarbylureido)]cyclopentadienes, α,β-[3,3'-bis(hydrocarbylureido)]cyclohexadienes, α,β-[3,3'-bis(hydrocarbylureido)]anthracenes, or α,β-[3,3'-bis(hydrocarbylureido)]naphthalenes.

10. The method of claim 1, where the cold-flow inhibitor is a vicinal amide-urea selected from the group consisting of α,β-[(3-hydrocarbylureido)(hydrocarbylamido)]hydrocarbylenes such as α,β-[(3-hydrocarbylureido)(hydrocarbylamido)]benzenes, trans-α,β-[(3-hydrocarbylureido)(hydrocarbylamido)]cyclohexanes, trans-α,β-[(3-hydrocarbylureido)(hydrocarbylamido)]cyclopentanes, α,β-[(3-hydrocarbylureido)(hydrocarbylamido)]cyclopentadienes, α,β-[(3-hydrocarbylureido)(hydrocarbylamido)]cyclohexadienes, α,β-[(3-hydrocarbylureido)(hydrocarbylamido)]anthracenes, or α,β-[(3-hydrocarbylureido)(hydrocarbylamido)]naphthalenes.

11. A method for preparing a polymeric composition, the method comprising:
   i) combining a polymer, solvent, and a cold-flow inhibitor defined by the formula

where Σ is a conformationally-immobile hydrocarbyl group, each δ individually includes a ureido or amido group with each δ being vicinally spaced on said Σ, and $R^1$ and $R^2$ are each individually a monovalent organic group; and
   ii) isolating at least a portion of the polymer and the cold-flow inhibitor from the solvent to provide a polymeric composition including the polymer and the cold-flow inhibitor.

12. The method of claim 11, where the polymer includes a polydiene or a polydiene copolymer.

13. The method of claim 12, where the polymer cement includes from about 10 to about 40% by weight of the polymer.

14. The method of claim 12, where said step of introducing includes introducing at least 0.5 parts by weight and less than 5.0 parts by weight of the cold-flow inhibitor per 100 parts by weight polymer.

15. The method of claim 12, where the cold-flow inhibitor is a vicinal diamide selected from the group consisting of α,β-[bis(hydrocarbylamido)]benzenes, trans-α,β-[bis(hydrocarbylamido)]cyclohexanes, trans-α,β-[bis(hydrocarbylamido)]cyclopentanes, α,β-[bis(hydrocarbylamido)]cyclopentadienes, α,β-[bis(hydrocarbylamido)]cyclohexadienes, α,β-[bis(hydrocarbylamido)]anthracenes, or α,β-[bis(hydrocarbylamido)]naphthalenes.

16. The method of claim 12, where the cold-flow inhibitor is a vicinal diurea selected from the group consisting of α,β-[3,3'-bis(hydrocarbylureido)]benzenes, trans-α,β-[3,3'-bis(hydrocarbylureido)]cyclohexanes, trans-α,β-[3,3'-bis(hydrocarbylureido)]cyclopentanes, α,β-[3,3'-bis(hydrocarbylureido)]cyclopentadienes, α,β-[3,3'-bis(hydrocarbylureido)]cyclohexadienes, α,β-[3,3'-bis(hydrocarbylureido)]anthracenes, or α,β-[3,3'-bis(hydrocarbylureido)]naphthalenes.

17. The method of claim 12, where the cold-flow inhibitor is a vicinal amide-urea selected from the group consisting of α,β-[(3-hydrocarbylureido)(hydrocarbylamido)]hydrocarbylenes such as α,β-[(3-hydrocarbylureido)(hydrocarbylamido)]benzenes, trans-α,β-[(3-hydrocarbylureido)(hydrocarbylamido)]cyclohexanes, trans-α,β-[(3-hydrocarbylureido)(hydrocarbylamido)]cyclopentanes, α,β-[(3-hydrocarbylureido)(hydrocarbylamido)]cyclopentadienes, α,β-[(3-hydrocarbylureido)(hydrocarbylamido)]cyclohexadienes, α,β-[(3-hydrocarbylureido)(hydrocarbylamido)]anthracenes, or α,β-[(3-hydrocarbylureido)(hydrocarbylamido)]naphthalenes.

18. A polymeric composition comprising:
   i.) a polydiene or polydiene copolymer; and
   ii.) a cold-flow inhibitor selected from the group consisting of vicinal diamides, vicinal diureas and vicinal amide-ureas.

19. A vulcanizate prepared from the polymeric composition of claim 18.

20. A tire component prepared from the polymeric composition of claim 18.

* * * * *